United States Patent [19]
Maeda et al.

[11] Patent Number: 5,641,998
[45] Date of Patent: Jun. 24, 1997

[54] SIMPLIFIED VEHICLE ENGINE CONTROL DEVICE FOR MOUNTING ON A VEHICLE WITHOUT ANTI-THEFT FUNCTION EXHIBITING AN IMMOBILIZING FUNCTION IF USED TO REPLACE A MORE COMPLICATED ENGINE CONTROL DEVICE MOUNTED ON A VEHICLE WITH ANTI-THEFT FUNCTION

[75] Inventors: Susumu Maeda; Eiji Mutoh; Shinichi Kubota, all of Wako, Japan

[73] Assignee: Honda Giken Kogyo Kabushiki Kaisha, Tokyo, Japan

[21] Appl. No.: 465,316

[22] Filed: Jun. 5, 1995

[30] Foreign Application Priority Data

Nov. 9, 1994 [JP] Japan ................... 6-299026

[51] Int. Cl.$^6$ ........................................ B60R 25/00
[52] U.S. Cl. ........................... 307/10.2; 180/287
[58] Field of Search ................. 307/10.1–10.6; 180/287; 340/426, 542, 825.3–825.32, 825.34, 825.44, 825.45, 825.69, 825.72; 70/DIG. 46, 252

[56] References Cited

U.S. PATENT DOCUMENTS

| | | | |
|---|---|---|---|
| 4,291,237 | 9/1981 | Kitano | 180/287 |
| 4,366,466 | 12/1982 | Lutz | 180/287 |
| 4,738,334 | 4/1988 | Weishaupt | 180/287 |
| 4,945,335 | 7/1990 | Kimura et al. | 307/10.2 |
| 4,965,460 | 10/1990 | Tanaka et al. | 307/10.2 |
| 5,359,230 | 10/1994 | Namiki et al. | 307/10.1 |
| 5,388,091 | 2/1995 | Kagawa | 307/10.1 |
| 5,442,243 | 8/1995 | Bailey | 307/10.5 |

FOREIGN PATENT DOCUMENTS

| | | |
|---|---|---|
| 0372741 | 6/1990 | European Pat. Off. . |
| 2046827 | 11/1980 | United Kingdom . |

*Primary Examiner*—Richard T. Elms
*Attorney, Agent, or Firm*—Pollock, Vande Sande & Priddy

[57] ABSTRACT

An engine control device exhibiting a unique vehicle anti-theft function which prevents a vehicle from being stolen when equipped physically on a vehicle in place of an engine control device with vehicle anti-theft function. The antenna unit detection circuit in an ECU 30b' instructs engine ECU 16 to inhibit engine control when it is detected that an antenna unit 29 which should not originally be connected to ECU 30b' has been connected to ECU 30b', that is, the ECU 30b' without anti-theft function is attached to a vehicle to which an ECU 30a with anti-theft function is to be attached.

4 Claims, 7 Drawing Sheets

SIMPLIFIED VEHICLE ENGINE CONTROL DEVICE FOR MOUNTING ON A VEHICLE WITHOUT ANTI-THEFT FUNCTION EXHIBITING AN IMMOBILIZING FUNCTION IF USED TO REPLACE A MORE COMPLICATED ENGINE CONTROL DEVICE MOUNTED ON A VEHICLE WITH ANTI-THEFT FUNCTION

BACKGROUND OF THE INVENTION

1. Field of the Invention

The present invention is related to an engine control device which is to be originally mounted on a vehicle without a vehicle anti-theft function, and particularly to an engine control device which prevents the vehicle from being stolen when equipped in place of an engine control device with a vehicle anti-theft function which initiates an engine control upon detection of a right ID code.

2. Description of the Prior Art

In some of the various proposals for preventing the theft of a vehicle such as a car, the vehicle is prevented from being started up or It is immobilized by mechanical and/or electrical means when It is attempted to be started up or moved using of a wrong key. This is achieved by previously storing an identification code or a key ID code in a key, reading the key ID code when the key is inserted into a key cylinder to start up the vehicle, comparing it with a reference ID code prestored in the vehicle, generating an enable signal only when there is a match between both ID codes, and enabling the engine to be started up only when an engine control unit successfully receives the enable signal. In this case, since a theft may be committed by mechanical breakage or illegal wiring if the enable signal is a binary signal of on/off, the encoding of the enable signal has been proposed, for instance, in the "Car Technology", Vol. 48, No. 8, 1994, pp. 59–64.

Figure 7:
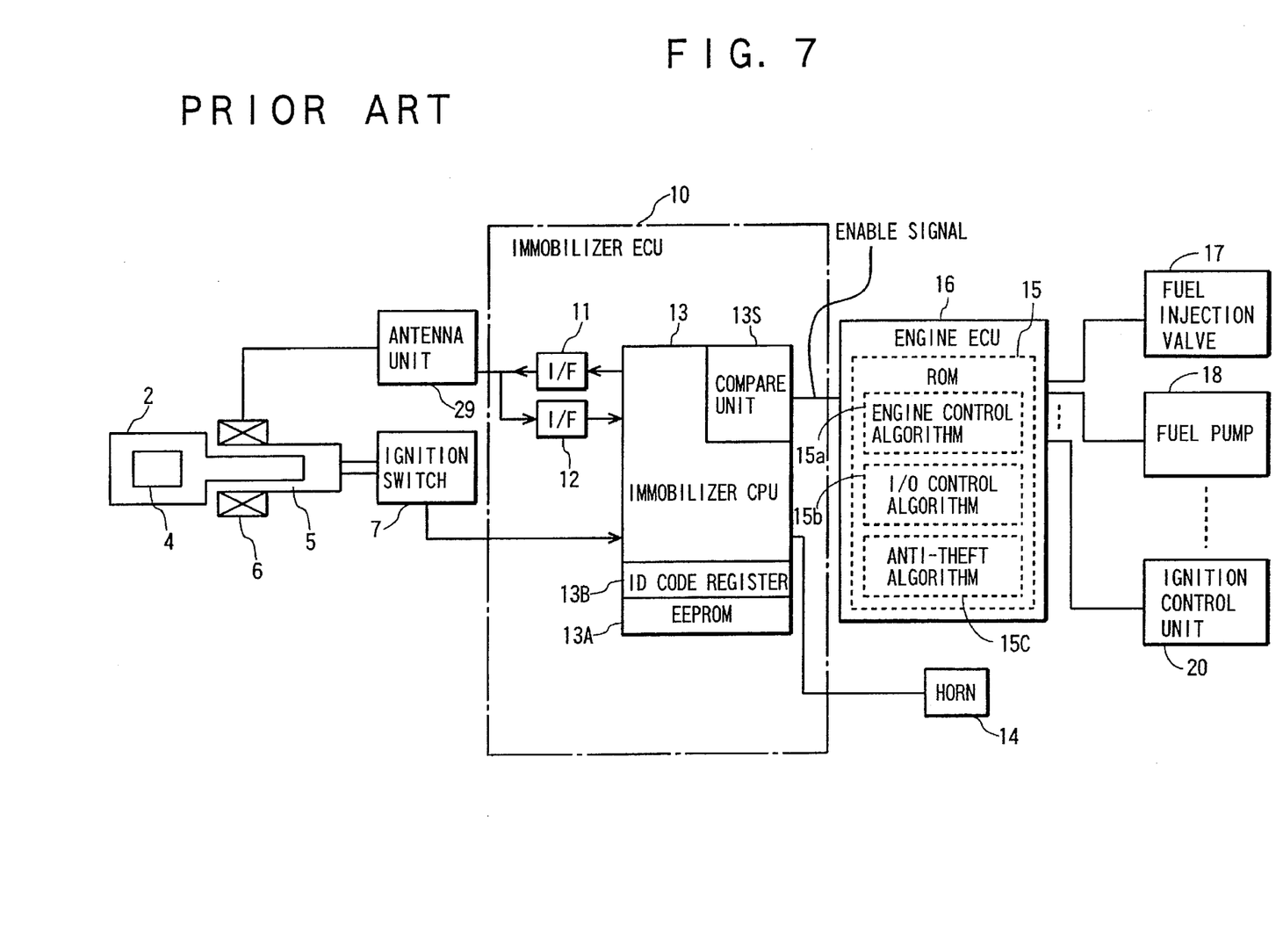
FIG. 7 is a block diagram showing the conventional immobilizer unit with anti-theft function.

An example of such a conventional transponder type immobilizer is shown in FIG. 7. A key 2 includes a memory (not shown) in which a key ID code (for instance, of 64 bits) is prestored, and a transmitter 4 for transmitting the key ID code. The transmitter 4 of the key 2 and a key cylinder 5 are coupled together by, for instance, an induction coil (antenna) 6.

When the key 2 is inserted into the key cylinder and rotated to the ignition ON position, an ignition switch 7 is closed. In response to this, an immobilizer CPU 13 operates, and operating electric power is supplied from a power amplifier of an antenna unit 29 to the transmitter 4 through the coil (antenna) 6. The transmitter 4 responds to this to read the key ID code, and transmits it to the key cylinder 5.

The received key ID code is amplified in the antenna unit 29, digitized by a I/F circuit 12 in an immobilizer 10, and read into a CPU 13 and temporarily stored in an appropriate ID code register 13B in the CPU 13. In an EEPROM 13A of the CPU 13, a unique reference ID code assigned to each vehicle is prestored, and the reference ID code and the key ID code which was read in are compared with each other by a compare unit 13S of the CPU 13. If it is determined that there Is a match between the two ID codes or they are in a predetermined relationship, an enable code is transmitted from the compare unit 13S to an engine control unit (ECU) 16. At the same time, a starter relay is activated to initiate the rotation of a starter motor (not shown).

In a ROM 15 of the engine ECU 16, an engine control program is stored which includes at least an engine control algorithm 15a, an I/O (Input/Output) control algorithm 15b and an anti-theft algorithm 15c. The engine ECU 16 operates according to the engine control program, and discriminates and verifies the reception of an enable code by the anti-theft algorithm 15c. If the enable code is a right code data, engine ECU 16 performs a specific control based on the engine control algorithm 15a for the respective terminal devices such as a fuel Injection valve 17, a fuel pump 18 and an ignition control unit 20 each of which is connected to each signal port selected by the I/O control algorithm 15b, thereby to enable the start-up and running of the vehicle.

If the reference ID code stored in the EEPROM 13A and the key ID code transmitted from the key 2 and read in the ID code register 13B do not match each other or they are not in a predetermined relationship, the compare function unit 13S does not issue an enable code. Accordingly, the start-up of the vehicle by the ECU 16 is inhibited, and a horn 14 is activated by the CPU 13 to provide an appropriate alarm and display.

When the enable code transmitted from the compare unit 13S is not right code data, start-up of the vehicle by the engine ECU 16 is also inhibited. Thus, illegal start-up of the engine and driving of the vehicle by a wrong key are prevented to ensure the vehicle anti-theft function.

Figure 8:
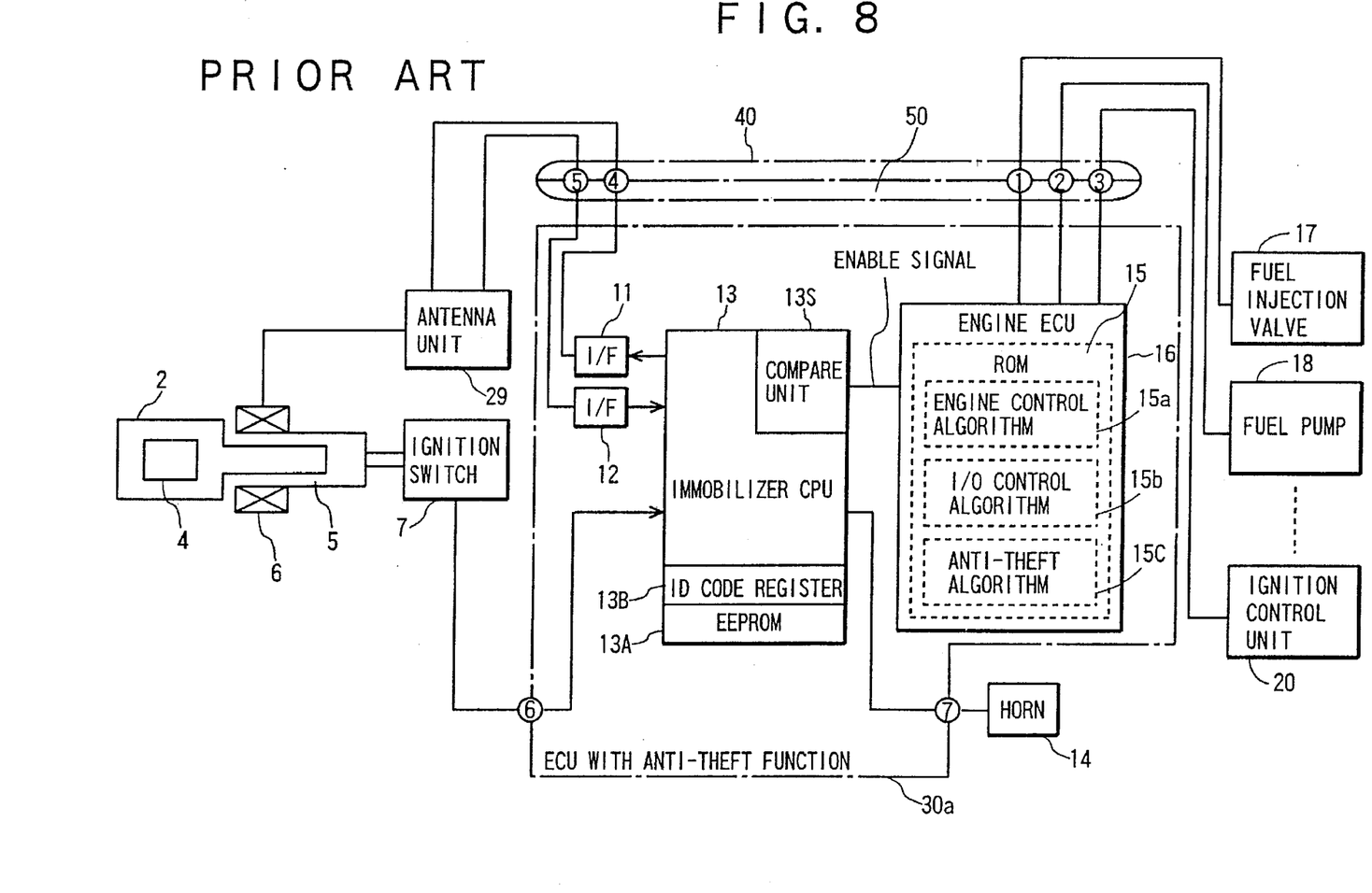
FIG. 8 is a block diagram showing the ECU with anti-theft function.

Although the immobilizer unit 10 and the engine ECU 16 are separate from each other in the system of FIG. 7, the function of the immobilizer unit 10 and that of the S engine ECU 10 may be integrated into one unit as an inte- gral-type ECU 30a with an anti-theft function, as shown in FIG. 8, whereby the number of parts is reduced to increase productivity. Since, in such integral structure, it is not necessary to encode the signal transferred from the immobilizer CPU 13 to the engine ECU 16, a simple binary signal can be utilized as an enable signal.

Figure 6:
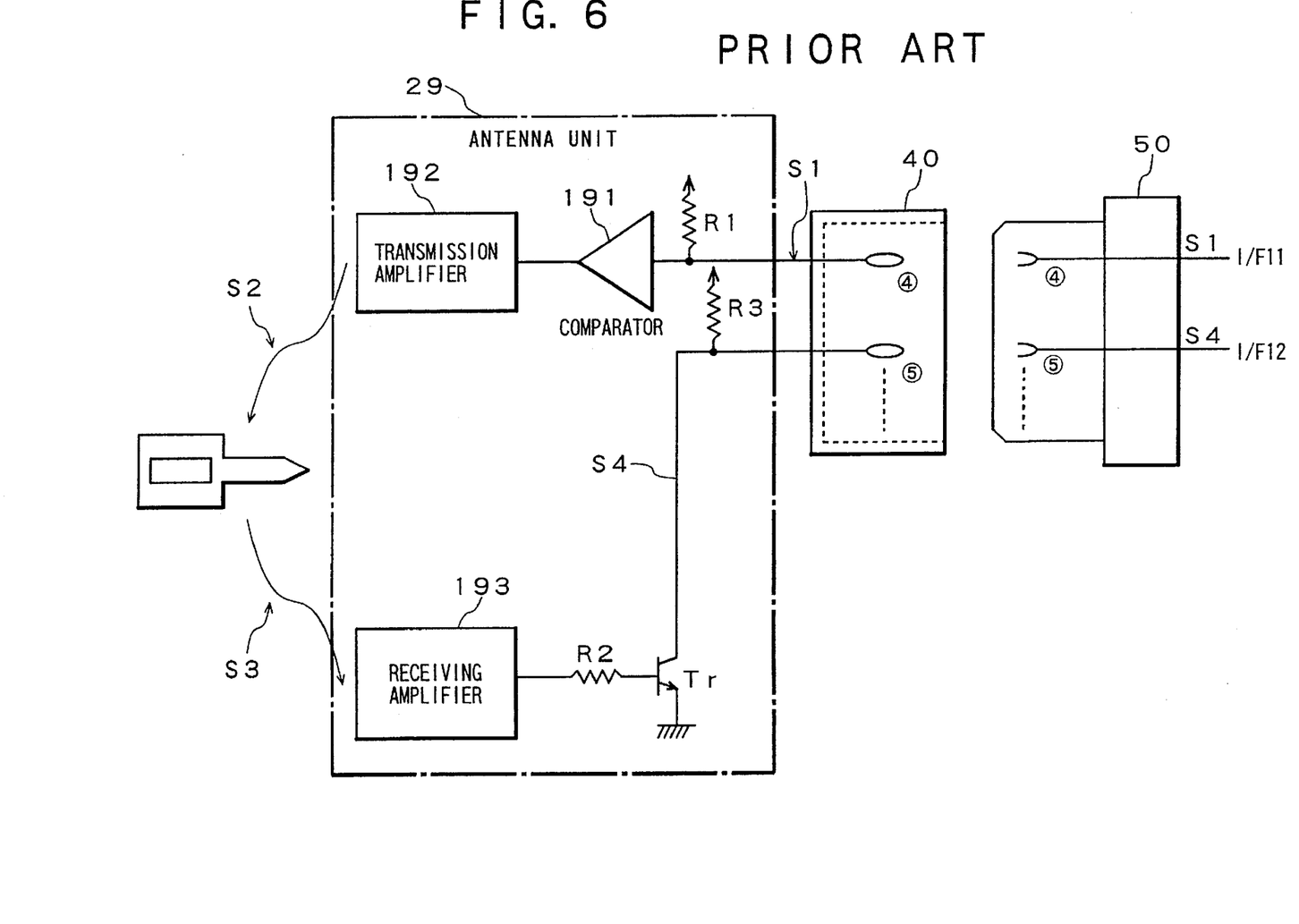
FIG. 6 is a block diagram of the antenna unit equipped on a vehicle with anti-theft function.
Figure 10:
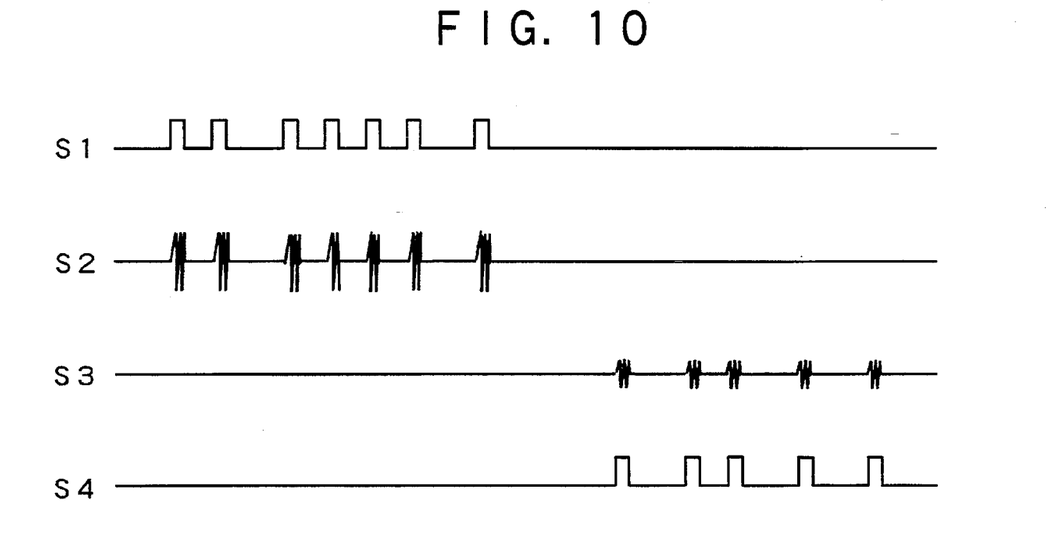
FIG. 10 is a diagram showing the signal waveforms at the main portions of an antenna unit shown in FIG. 6.

FIG. 6 is a block diagram of said antenna unit 29, and FIG. 10 is a diagram showing the signal waveforms at the main portions thereof. The antenna unit 29 is electrically connected to ECU 30a via a pair of connectors 40 and 50, along with the terminal devices of the drive and control systems essential to the engine control such as the fuel injection valve 17 and the fuel pump 18 as shown in FIG. 8. In this case, to a pin ④ of the connector 40 on the antenna unit 29 side, the input terminal of a comparator 191 and one terminal of a pull-up resistor R1 are connected, and to a pin ⑤, the collector of a transistor Tr and one terminal of a pull-up resistor R3 are connected. On the other hand, the interface 11 is connected to a pin ④ of the connector 50 on the ECU 30a side, and the interface 12 is connected to a pin ⑤.

In such a construction, a signal S1 outputted from the interface 11 of the ECU 30a is supplied to an transmission amplifier 192 through the comparator 191 in the antenna unit 29, and supplied to the induction coil 6 as a signal S2. In addition, a signal S3 generated in the induction coil 6 is amplified in a receiving amplifier 193, and supplied to the interface 12 in the ECU 30a through the transistor Tr as a signal S4.

The function of the above described transponder type immobilizer for preventing illegal engine start-up and vehicle driving is very effective for vehicles to be used in areas or countries where thefts occur frequently, but, if this function is provided even on vehicles to be used in areas where thefts occur Infrequently, users are undesirably forced to share the cost burden of the unnecessary equipment. Accordingly, it is preferable that vehicles which are or are not equipped with the anti-theft function are manufactured in parallel depending on their destination.

Figure 9:
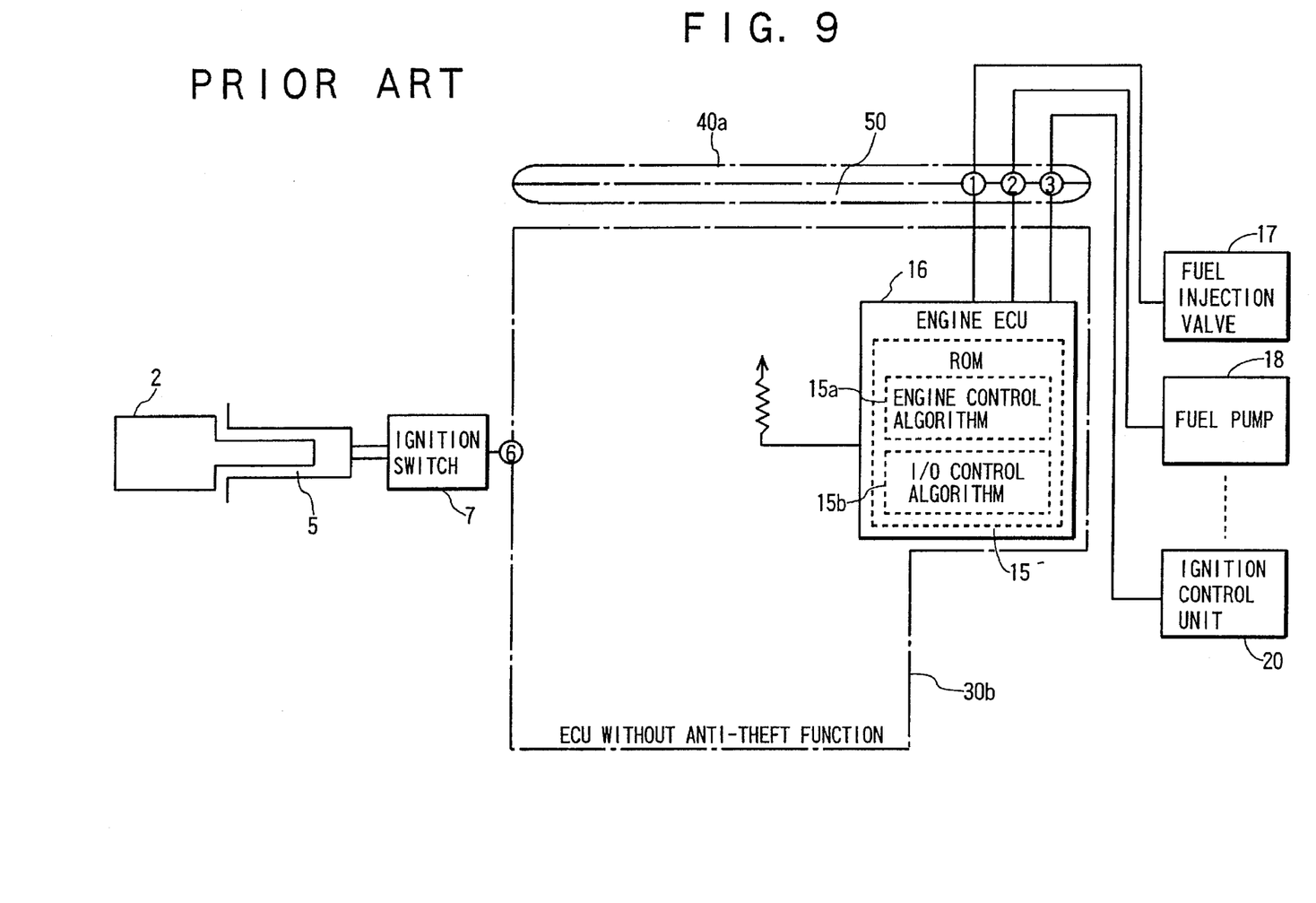
FIG. 9 is a block diagram showing the prior art ECU without anti-theft function.

FIG. 9 shows the construction of the main portions of an ECU 30b without any anti-theft function, which is mounted on vehicles which are not to be equipped with the anti-theft function, instead of the ECU 30a with the anti-theft function.

As apparent from the comparison of FIG. 9 with FIGS. 7 and 8, the transmitter 4 of the key 2 and the induction coil 6 of the key cylinder 5 have been removed In FIG. 9, and in the ECU 30b, the anti-theft unit elements such as the I/F circuits 11 and 12 and the immobilizer CPU 13 which correspond to the immobilizer unit 10 of FIG. 7 have been removed. As for the ROM for storing the engine control program executed by the engine ECU 16, the above ROM 15 in FIG. 7 Including the anti-theft algorithm 15c for performing the verification of the enable code, or the like has been replaced with R0M 15' which does not include anti-theft algorithm 15c.

Generally, the ECUs 30a and 30b are connected to the antenna unit 29, and the terminal devices such as the fuel injection valve 17, and the like by the pair of connectors 40 and 50 which are relatively easily Inserted and removed. Accordingly, there was a problem that, once an ill-intentioned third party illegally gets an ECU 30b having no anti-theft function and replaces ECU 30a with the ECU 30b, the starting-up and driving of the vehicle would be possible without the discrimination of ID code outputted from the antenna unit 29, and thus the theft of the vehicle would be accomplished.

SUMMARY OF THE INVENTION

It is an object of the present invention to provide an engine control device which prevents the vehicle from being stolen when equipped physically in place of an engine control device having the vehicle anti-theft function.

The engine control device of the present invention which is to be originally mounted on a vehicle without a vehicle anti-theft function is able to replace physically with an engine control device with vehicle anti-theft function of a vehicle anti-theft system, the system comprising an ID code detection means. The device of the present invention comprises a means for determining whether ID code detection means is provided on the vehicle and a means for prohibiting the engine control, if it is determined that said ID code detection means is provided.

In accordance with the above described construction, when the engine control device of the present invention is mounted on a vehicle on which the engine control device with vehicle anti-theft function is to be mounted, it is determined by the engine control device of the present invention that the ID code detection means is equipped on the vehicle, and the engine start-up of the vehicle is inhibited. Accordingly, even if someone illegally gets the engine control device of the present invention and tries to use it instead of the engine control device, with the vehicle anti-theft function it is determined that the ID code detection means exists, and the start-up of the engine is inhibited to prevent the vehicle from being stolen.

DETAILED DESCRIPTION OF THE PREFERRED EMBODIMENT

Figure 1:
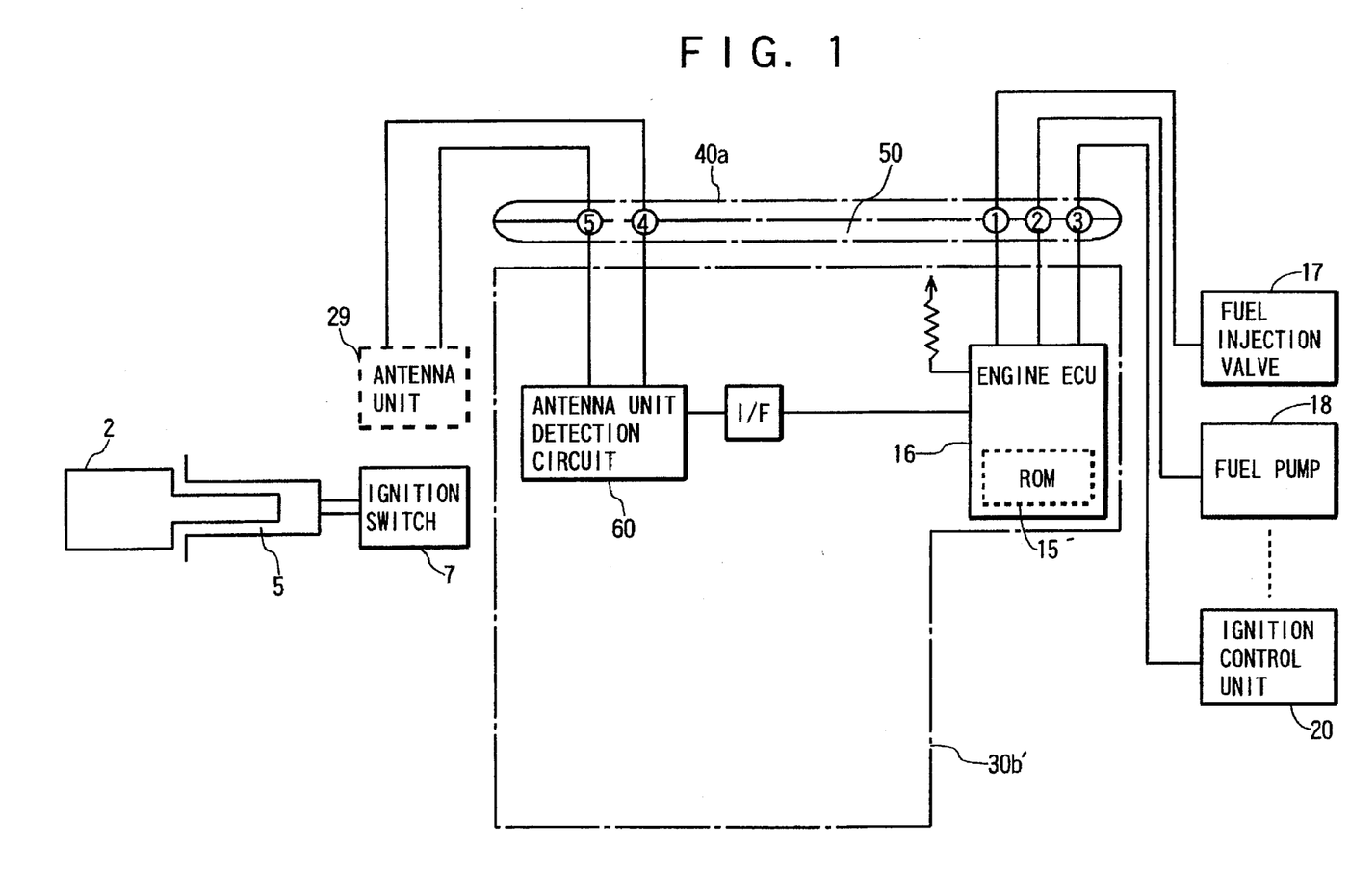
FIG. 1 is a block diagram showing an embodiment of the present invention.

Now, embodiments of the present invention are described in detail with respect to the drawings. FIG. 1 is a block diagram showing the first embodiment of the present invention, especially the construction of the ECU 30b' which is to be originally mounted on a vehicle including no anti-theft function, and the same symbols as the above described ones represent the same or identical portions.

This embodiment is characterized by providing an antenna unit detection means 60 for detecting whether or not the antenna unit 29 is connected to the ECU 30b' for anti-theft function through a pair of connectors 40 and 50. The antenna unit detection means 60 instructs the engine ECU 16 to inhibit the engine control if it is detected that the antenna unit 29 which should not originally be connected to ECU 30b' is connected to ECU 30b, that is, the ECU 30b has been mounted on a vehicle on which the ECU 30a with anti-theft function (the function of the immobilizer unit 10) is to be originally mounted.

Figure 2:
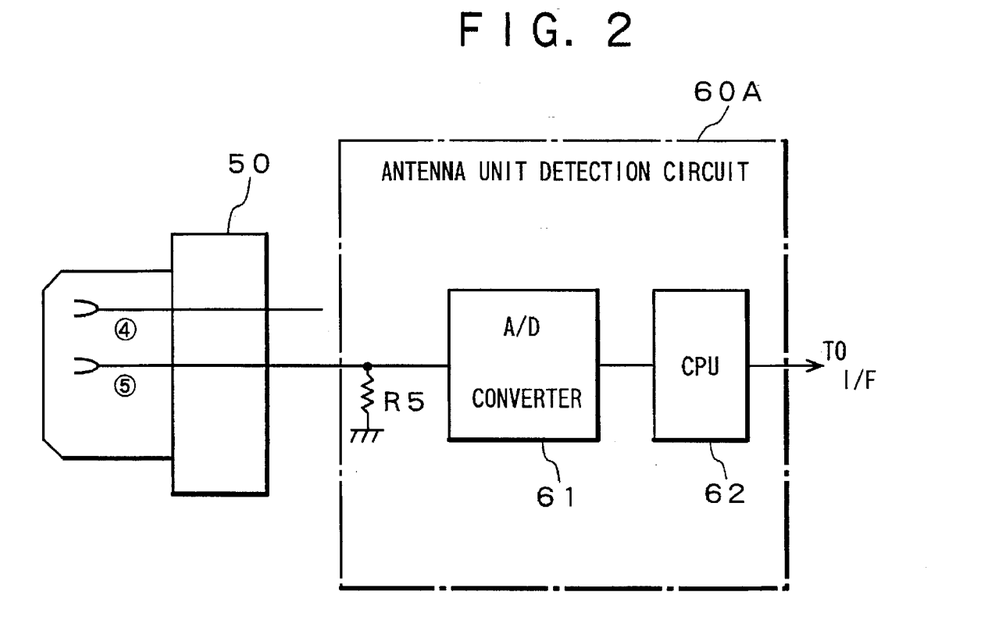
FIG. 2 is a block diagram showing an embodiment of an anntena unit detection circuit of the present invention.

FIG. 2 is a diagram showing an example of the antenna unit detection circuit 60A and the connection relationship with the connector 50 of the ECU 30b'. A contact ④ of the connector 50 is opened. To a contact ⑤, one end of a pull-down resistor R5 and the input terminal of an A/D converter 61 are connected. The other end of the pull-down down resistor R5 is connected to a reference ground voltage source. The output terminal of the A/D converter 61 is connected to the Input terminal of a CPU 62.

In such a construction, for the connector 40 to which the antenna unit 29 is not connected, its contacts ④ and ⑤ are both open, and thus the contact ⑤ of the connector 50 is kept in open state when the connector 40 is connected to the connector 50. Accordingly, the input voltage of the A/D converter 61 is fixed to 0 V by the pull-down resistor R5. On the other hand, for the connector 40 to which the antenna unit 29 is connected for anti-theft function, the pull-up resistor R3 (FIG. 6) in the antenna unit 29 and the pull-down resistor R5 serve as voltage dividing resistors, and a predetermined value of voltage (e.g. 2.5 V) is applied to the input terminal of the A/D converter 61. Thus, the CPU 62 can detects the connection of the antenna unit 29 on the basis of its input voltage value.

Accordingly, even if an Ill-intentioned third party illegally tries to replace the ECU 30a including the anti-theft function with the ECU 30b' to prevent the discrimination of matching of the enable code from being performed, the engine control by the ECU 16 is inhibited based on the discrimination output to the CPU 62 from the antenna unit detection means 60A, and thus the start-up of the engine is prevented.

Figure 3:
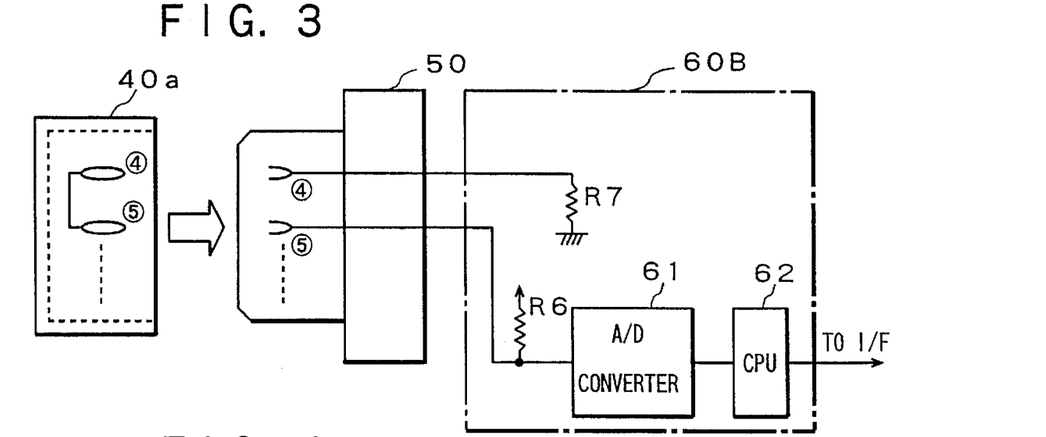
FIG. 3 is a diagram showing a modified example of the antenna unit detection circuit.

FIG. 3 is a diagram showing a modified example of the antenna unit detection circuit 60B and a connection relationship with the connector 50 of the ECU 30b', according to the present invention. The contact ④ is grounded through a resistor R7, and one terminal of a pull-up resistor R6 and the input terminal of the A/D converter 61 are connected to the contact ⑤. The output terminal of the A/D converter 61 is connected to the CPU 62. The other terminal of the pull-up resistor R6 is connected to a reference voltage point. In the connector 40a to which the terminal devices are to be connected, but the antenna unit 29 is not to be originally connected, the contacts ④ and ⑤ are previously short-circuited as shown in FIG. 3.

If the normal right connector 40a is connected to the connector 50 as shown in FIG. 3, since the contacts ④ and ⑤ of the connector 50 are also short-circuited, a resistor R7 and the pull-up resistor R6 serve as voltage dividing resistors and a predetermined voltage is applied to the input terminal of the A/D converter 61. On the other hand, if the connector 50 of the antenna unit detection circuit 60B is connected with the connector 40 to which the antenna unit 29 is connected for anti-theft function, a voltage different from the predetermined value is applied to the input terminal of the A/D converter 61. Accordingly, the CPU 62 can detect the existence of the antenna unit 29 depending on the value of the voltage at its input terminal.

Figure 4:
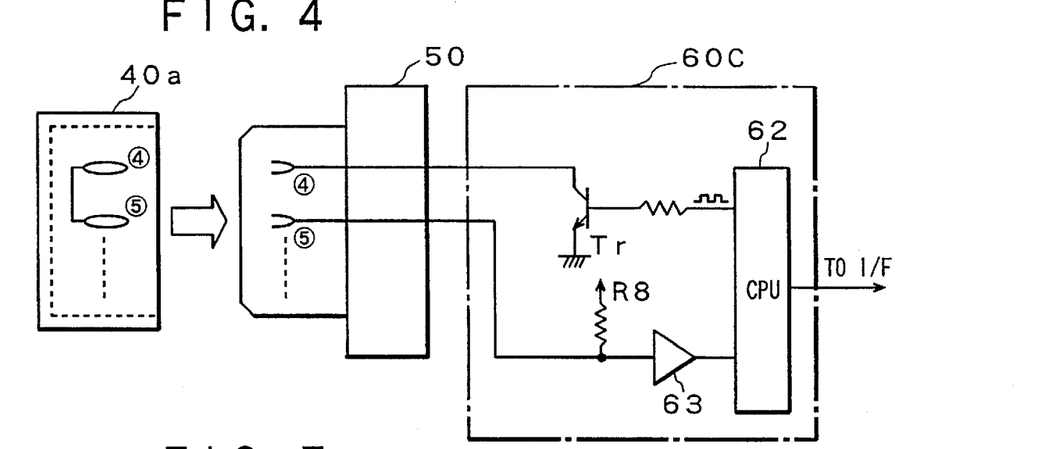
FIG. 4 is a diagram showing a further modified example of the antenna unit detection circuit.

FIG. 4 is a diagram showing a further modified example of the antenna unit detection circuit 60C and the connection relationship with the connector 50 of the ECU 30b, in which the contact ④ of the connector 50 is connected to the collector of a transistor Tr, and one terminal of a pull-up resistor R8 and the input terminal of a comparator 63 are connected to the contact ⑤. In the connector 40a which the antenna unit 29 is not to be originally connected to, the contacts ④ and ⑤ are previously short-circuited as in the above case. The base of the transistor Tr is connected to an output port of the CPU 62 through a resistor, and the emitter is connected to ground.

Since the contacts ④ and ⑤ of the connector 50 are also short-circuited, if the right connector 40a to which the antenna unit 29 is not connected is connected to the connector 50, and thus, when a pulse signal S1 (FIG. 10) is supplied to the transistor Tr from the CPU 62, the substantially in-phase pulse signal as outputted from the CPU 62 is input to the comparator 63. On the other hand, if the antenna unit detection circuit 60C is connected with the contacts ④ and ⑤ of the connector 40 to which the antenna unit 29 has been connected, an out-of-phase pulse signal S4 is input to the comparator 63, as shown in the FIG. 10. Thus, the CPU 62 can detect the existence of the antenna unit 29 on the basis of the result of the comparison by the comparator 63.

Figure 5:
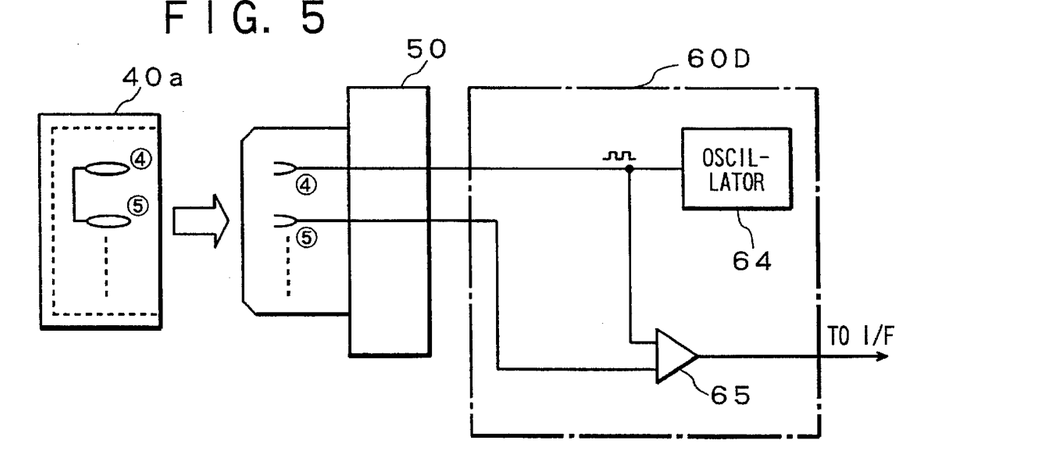
FIG. 5 is a diagram showing a still further modified example of the antenna unit detection circuit.

FIG. 5 is a diagram showing a still further modified example of the antenna unit detection circuit 60D and the connection relationship with the connector 50 of the ECU 30b, in which the output terminal of an oscillator 64 is directly connected to the contact ④ of the connector 50 and one input terminal of a comparator 65, while the other input terminal of the comparator 65 is connected to the contact ⑤. in the connector 40a to which the antenna unit 29 is not originally connected, the contacts ④ and ⑤ are previously short-circuited as in the above cases.

Since the contacts ④ and ⑤ of the connector 50 are also short-circuited. if the right connector 40a is connected to the connector 50, when a pulse signal S1 is outputted from the oscillator 64, the substantially in-phase pulse signal as the outputted pulse signal is inputted to the comparator 65. On the other hand, if the wrong connector 40 to which the antenna unit 29 has been connected is connected to the connector 50, an out-of-phase pulse signal S4 is inputted to the comparator 65 as in FIG. 4. Accordingly, based on the result of the comparison by the comparator 65, the existence of the antenna unit 29 is detected by the engine ECU 16.

As described above, in accordance with the present invention, even if an ill-intentioned third party illegally tries to replace a electronic circuit unit (ECU 30a ) having the anti-theft function with a wrong electronic circuit unit (ECU 30b') without anti-theft function, thereby to prevent the discrimination of matching of the enable code from being performed, the engine control is inhibited on the basis of the output of the antenna unit detection circuit 60, and thus the start-up of the engine is prevented.

What is claimed is:

1. A simplified engine control device for mounting on a vehicle that does not have an anti-theft function, said simplified engine control device being capable of also being mounted on a vehicle having an anti-theft function in place of a more complicated engine control device that cooperates with an ID code detection means to perform an immobilizing function for a vehicle with an anti-theft function, said simplified engine control device comprising:

means for determining whether an ID code detection means is provided on a vehicle on which said simplified engine control device is mounted, and means for rendering said simplified engine control device inoperable when it is determined that ID code detection means is provided on the vehicle.

2. The simplified engine control device of claim 1 wherein said simplified engine control device, when mounted on a vehicle, is connected to engine control components through electrical connector means that would also be connected to an ID code detection device if such an ID code detection device is present on the vehicle, said means for determining whether ID code detection means is provided on the vehicle comprising means responsive to the nature of the signal on said connector means when said simplified engine control device has been electrically connected to said engine control components.

3. The simplified engine control device of claim 2 wherein said means for determining whether ID code detection means is provided on the vehicle comprises:

a first resistor element for pulling down a first terminal of said connector means on the engine control device side, a second resistor element for pulling up a second terminal of said connector means on the engine control device side, means for detecting a signal on one of said first and second terminals, and means for determining whether said ID code detection means is present on the basis of said detected signal, said first and second terminals of said connector means on the engine control device side being short-circuited when said connector means on said engine control device side is connected to a connector means on the terminal device side to which said connector means of the simplified engine control device is to be connected.

4. The simplified engine control device of claim 3 wherein said means for determining whether ID code detection means is provided on the vehicle comprises:

means for generating a pulse signal on a first terminal of said connector means on the engine control device side, means for comparing a signal on a second terminal of said connector means on the engine control device side with said pulse signal, and determining whether ID code detection means are present based on the result of said comparison, said first and second terminals of said connector means on the engine control device side being short-circuited when said connector means is connected to connector means on the terminal device side to which said connector means of the simplified engine control device is to be connected.

* * * * *